United States Patent [19]

Bancroft et al.

[11] Patent Number: 6,124,694

[45] Date of Patent: Sep. 26, 2000

[54] WIDE AREA NAVIGATION FOR A ROBOT SCRUBBER

[76] Inventors: Allen J. Bancroft, 23536 Springriver Dr., Elkhart, Ind. 46516; Daniel M. Daly, 58237 Baxter Cir., Elkhart, Ind. 46516-6077

[21] Appl. No.: 09/271,705

[22] Filed: Mar. 18, 1999

[51] Int. Cl.⁷ .................................................. B64C 13/18
[52] U.S. Cl. ................... 318/587; 15/319; 318/568.12
[58] Field of Search .................................. 318/587, 640, 318/568.12, 568.16, 652; 180/167, 169; 901/1, 46; 15/49.1, 98, 319, 340.1, 340.4

[56] References Cited

U.S. PATENT DOCUMENTS

| | | |
|---|---|---|
| 4,119,900 | 10/1978 | Kremnitz . |
| 4,638,445 | 1/1987 | Mattaboni . |
| 4,700,427 | 10/1987 | Knepper ................................... 15/319 |
| 4,967,064 | 10/1990 | Field et al. . |
| 4,968,878 | 11/1990 | Pong et al. ............................. 250/221 |
| 4,996,468 | 2/1991 | Field et al. . |
| 5,020,620 | 6/1991 | Field . |
| 5,032,775 | 7/1991 | Mizuno et al. ......................... 318/587 |
| 5,151,608 | 9/1992 | Torii et al. ............................. 250/561 |
| 5,279,672 | 1/1994 | Betker et al. . |
| 5,548,511 | 8/1996 | Bancroft . |
| 5,563,787 | 10/1996 | Murayama . |
| 5,623,334 | 4/1997 | Cho et al. . |
| 5,633,706 | 5/1997 | Cho et al. . |
| 5,720,077 | 2/1998 | Nakamura et al. ....................... 15/340 |

*Primary Examiner*—Paul Ip
*Assistant Examiner*—Rina I. Duda
*Attorney, Agent, or Firm*—Pearne & Gordon, LLP

[57] ABSTRACT

A cleaning robot navigates a wide area by using sonar near the walls and a laser range finder for distances beyond the range of the sonar. The sonar is used with the laser to establish baselines. The laser distances are then referenced to the baselines for improved accuracy during laser navigation.

4 Claims, 3 Drawing Sheets

WIDE AREA NAVIGATION FOR A ROBOT SCRUBBER

BACKGROUND OF THE INVENTION

This invention relates to a cleaning apparatus and, more particularly, to methods for the autonomous control of such an apparatus.

There is a great deal of current interest in autonomous cleaning devices or robots. With rising janitorial labor costs, increased computer processing power and dropping prices for sensors and electronic hardware, autonomous devices that once would have been too expensive or even impossible are now practical.

U.S. Pat. No. 5,548,511 shows a method for the autonomous cleaning of a floor area, particularly a hallway, and is included herein by reference. To clean larger floor areas, a method employing distance sensors having a longer range than that of sonar (e.g., 5 meters) is desirable. Light wave distance sensors, such as laser distance sensors, can be used over distances greater than those in the largest buildings. These light wave distance sensors have excellent relative distance measuring accuracy, but tend to have poorer absolute distance measuring accuracy. This is due at least in part to the small beam size exhibited by the sensor. The beam can enter relatively small openings or irregularities in the target wall or object and provide misleading distances.

SUMMARY OF THE INVENTION

A method for controlling a self-propelled cleaning robot between a first and a second wall, the robot having a first side and a second side, the first and second sides having a first and second sound wave distance sensor, respectively, and the second side having a light wave distance sensor, includes making a distant wall baseline pass along the first wall while measuring distance from the robot to the first wall with the first sound wave distance sensor and measuring distance from the robot to the second wall with the light wave distance sensor and determining a distant wall baseline. The method also includes making a near wall baseline pass along the first wall while measuring distance from the robot to the first wall with the second sound wave distance sensor and the light wave distance sensor and determining a near wall baseline. The method further includes navigating a serpentine path toward the second wall in response to distance measured from the robot to the walls with the light wave distance sensor in combination with the first wall baseline and the second wall baseline.

DESCRIPTION OF THE PREFERRED EMBODIMENTS

Figure 1:
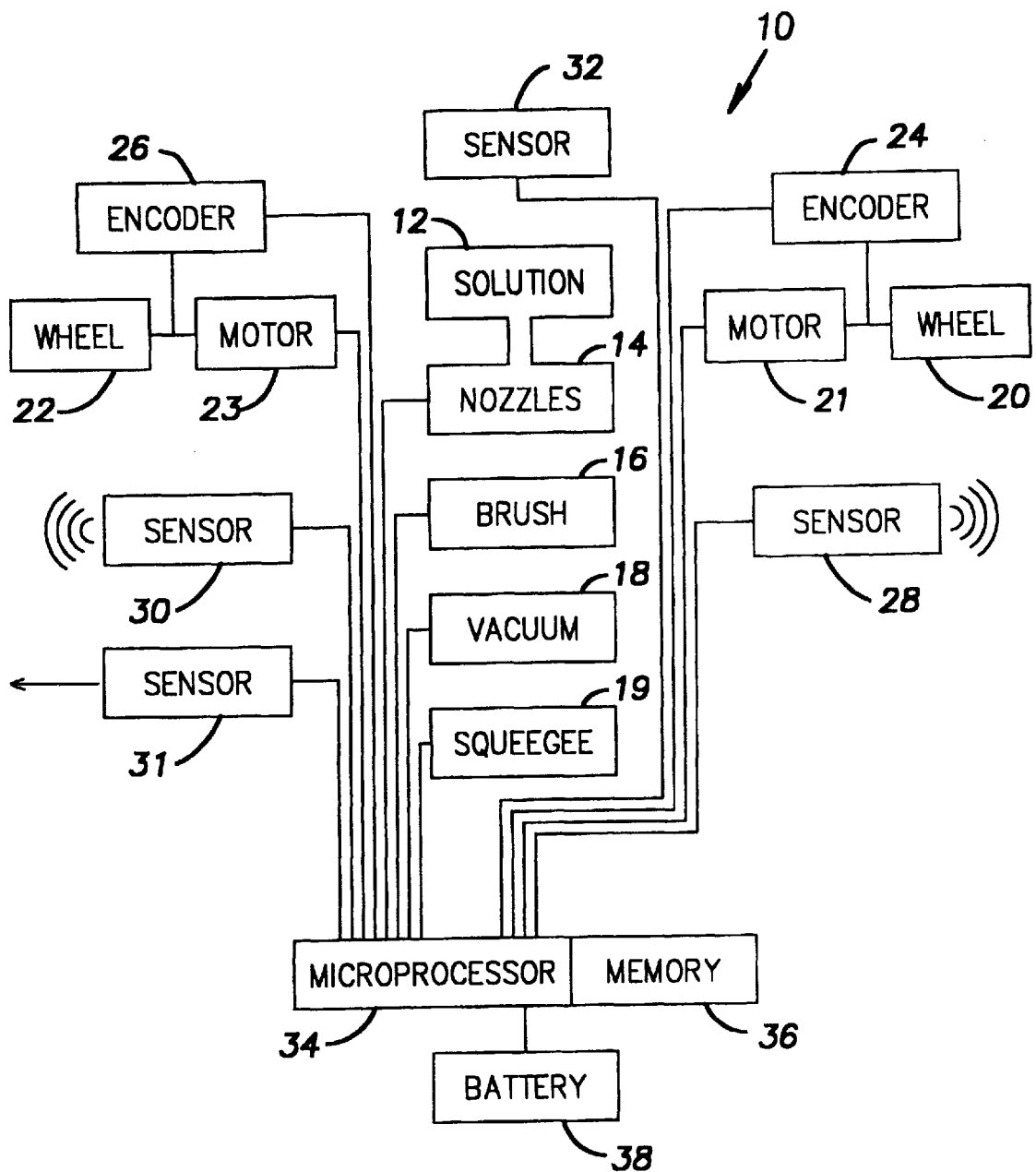
FIG. 1 is a block diagram of a robot according to the invention.

Referring to FIG. 1, a self-propelled autonomous cleaning robot 10 is provided with cleaning solutions 12, applicator nozzles 14, brush 16, vacuum 18 and squeegee 19 for cleaning floors.

The robot 10 is provided with a right drive wheel 20 driven by a motor 21 and a left drive wheel 22 driven by a motor 23. The wheels 20, 22 provide for movement and steering. Encoders 24, 26 for respective drive wheels 20, 22 provide digital indications of the amount of revolution of each drive wheel 20, 22. The encoders 24, 26 may be, for example, shaft encoders on either the wheels 20, 22 or some shaft intermediate thereto. Based on a known drive-wheel circumference, this revolution information provides a measure of the distance of travel of the robot 10, as well as maneuvering information. The robot 10 may move, for example, at a rate of 300–600 mm/sec.

A right sound wave sensor 28 measures distances from the robot 10 to a wall or boundary to the right of the robot 10. A left sound sensor 30 measures distances from the robot 10 to a wall or boundary to the left of the robot 10. The sensors 28, 30 may be, for example, ultrasonic sonar sensors. Sonar sensors may have, for example, a maximum range of 5 meters to either side of the robot 10.

A left light wave sensor 31 measures distance from the robot 10 to a wall or boundary to the left side of the robot 10. The sensor 31 may be, for example, a laser distance sensor. The laser sensor may have, for example, a maximum range of between 10 and 500 meters.

A forward sensor 32 detects obstacles in front the robot 10. The sensor 32 may be, for example, a contact sensor, a sonar sensor or an infrared sensor.

The operation of the components of the robot 10 are controlled in the preferred embodiment by a microprocessor 34 having associated memory 36. It is also possible to control the robot 10 with a general purpose computer or other digital controllers known in the art. The distance sensors 28, 30, 31 may provide, for example, distance information to the microprocessor 34 twice each second. The encoders 24, 26 provide distance travelled information to the microprocessor 34. The forward sensor 32 provides information to the microprocessor 34 on obstacles to the front of the robot 10. Electric power for the robot 10 is provided by a battery 38.

In operation, the robot 10 makes a distant wall baseline pass (FIG. 2), a near wall baseline pass (FIG. 3), a series of serpentine light wave distance sensor navigated passes (FIG. 4), and, optionally, a finishing baseline pass (FIG. 5) followed by a finishing series of serpentine sound wave navigated passes (FIG. 6).

Figure 2:
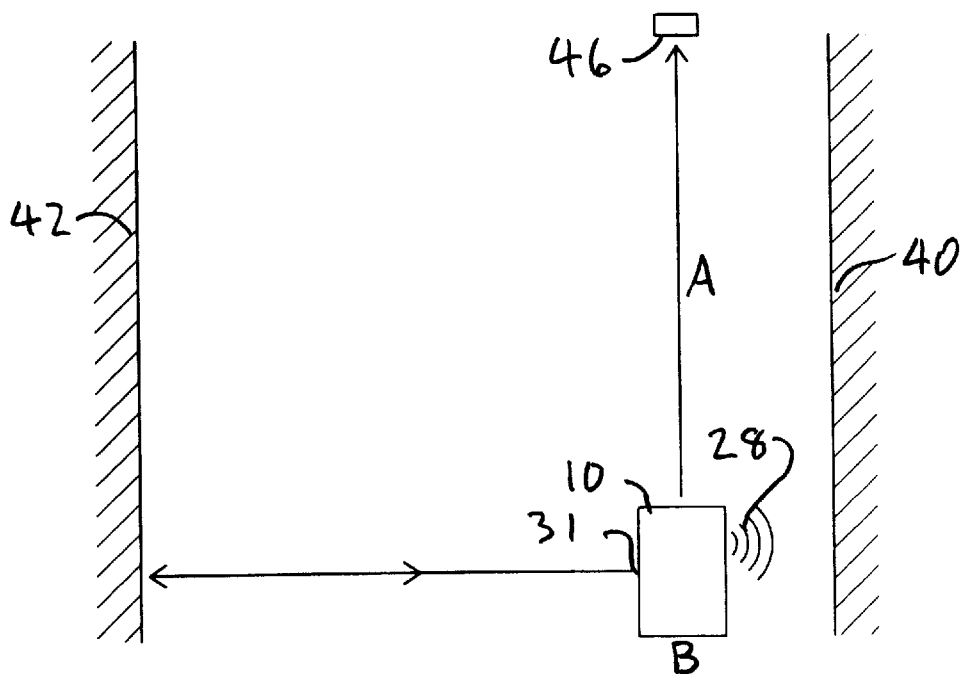
FIG. 2 is a plan view of an area to be cleaned showing an exemplary path of the robot during a far wall baseline pass according to the invention.

Referring to FIG. 2, the robot 10 is located near a wall 40 (i.e., within sound wave sensor range). Using the right sound sensor 28, the robot 10 navigates along the wall 40, measuring the distance from the robot 10 to the wall 40 and maintaining a path generally parallel to the wall 40 in response to the measured distance. As the robot 10 moves along the wall 40, the left light wave sensor 31 is used to measure the distance to the generally parallel opposite wall 42. The distance measured by the left light wave sensor 31 establishes a distant wall baseline.

Figure 3:
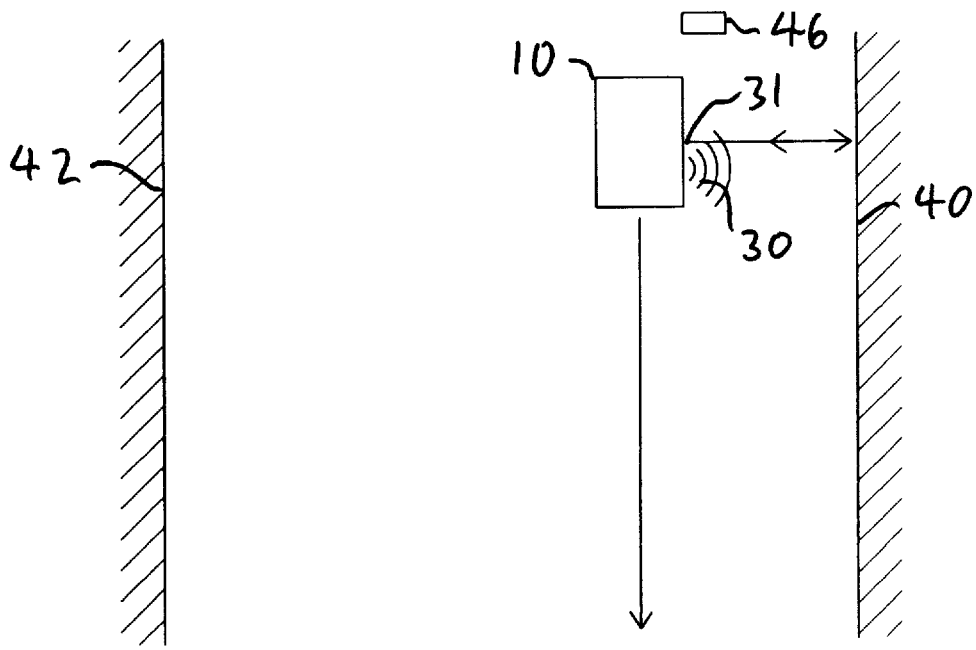
FIG. 3 is a plan view of the area of FIG. 2 showing an exemplary path of the robot during the near wall baseline pass according to the invention.

Referring to FIG. 3, the robot 10 is located near a wall 40 (i.e., within sound wave sensor range). Using the left sound wave sensor 30, the robot 10 navigates along the wall 40, measuring the distance from the robot 10 to the wall 40 and maintaining a path generally parallel to the wall 40 in response to the measured distance. As the robot 10 moves along the wall 40, the left light wave sensor 31 is also used to measure the distance to the wall 40. The distance measured by the light wave senor 31 establishes a near wall baseline.

Figure 4:
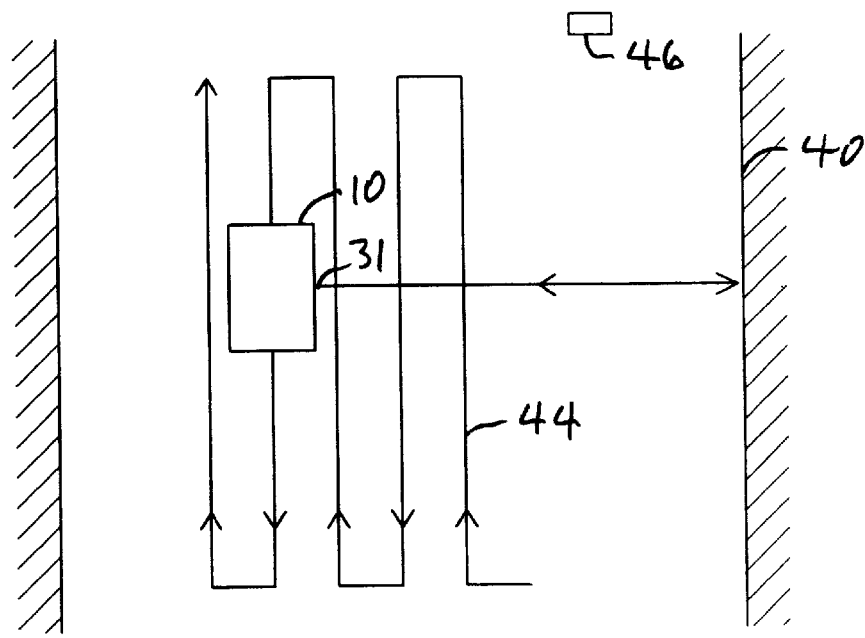
FIG. 4 is a plan view of the area of FIG. 2 showing an exemplary path of the robot navigating a serpentine path with a light wave distance sensor according to the invention.

Referring to FIG. 4, after the baseline passes, the robot 10 navigates a serpentine path 44 toward the wall 42 calculated by the robot 10 to traverse all of the area between the baselines and the wall 42. The robot 10 uses the light wave sensor 31 to measure the distance to the walls 40, 42. The distance to the wall 40 is used in combination with the near wall baseline to navigate when running with the light wave sensor 31 facing the wall 40. The distance to the wall 42 is used in combination with the far wall baseline to navigate when running with the light wave sensor 31 facing the wall 42.

The baselines are used to provide an absolute reference for the distance measured by the light wave sensor 31. The robot 10 uses the differences between the baseline value and the then current value to establish a "true" distance from the walls. This allows the robot 10 to make use of the excellent long range relative distance measurement accuracy of the light wave sensor 31 while using the excellent short range absolute distance measurement of the sound wave sensors 28, 30 for establishing the baselines.

It should of course be understood that the light wave sensor 31 may be equivalently located on the right side of the robot 10. Also, the baseline passes can be in either order and need not be the first passes along the wall 40. For example, the sound wave sensors 28, 30 may be used without the light wave senor 31 for navigating several passes until the robot 10 nears the range limits of the sound wave sensors 28, 30. Further, it should be noted that the term "wall" includes other similar boundaries capable of being sensed by the sensors 28, 30, 31.

Referring to FIG. 2, the longitudinal travel A of the robot 10 can be defined by unshown walls perpendicular to the walls 40, 42. Alternatively, the limits can be established based on the starting point B and an obstacle 46 placed in the path of the robot 10. The forward sensor 32 detects the obstacle 46 and thereafter the length of each pass is based on the distance from the point B to the obstacle 46.

Figure 5:
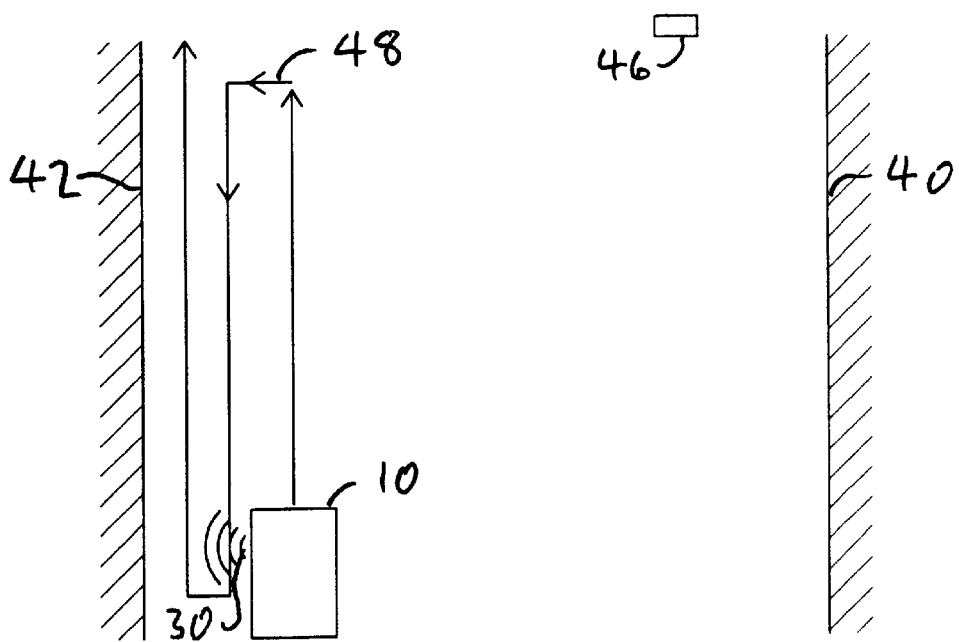
FIG. 5 is a plan view of the area of FIG. 2 showing an exemplary path of the robot navigating the finishing baseline path and a serpentine path with sound wave distance sensors according to the invention.

In some cases, it may be advantageous to further include a finishing baseline pass along the wall 42. Referring to FIG. 5, after the robot 10 navigates towards the wall 42 to within the range of the sound wave sensors 28, 30, the robot 10 measures the distance to the wall 42 with the closest of the sound wave sensors 28, 30. This establishes a finishing baseline that is used by the robot 10 to calculate a serpentine path 48 to traverse all of the area between the finishing baseline and the wall 42. The path 48 is then navigated based on the distance to the wall 42 measured by the closest of the sound sensors 28, 30.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A method for controlling a self-propelled cleaning robot between a first and a second wall, said robot having a first side and a second side, said first and second sides having a first and second sound wave distance sensor, respectively, and said second side having a light wave distance sensor, said method comprising:

making a second wall baseline pass along said first wall while measuring a first distance from said robot to said first wall with said first sound wave distance sensor and contemporaneously measuring a second distance from said robot to said second wall with said light wave distance sensor and determining a second wall baseline using said first distance and said second distance, said robot being substantially closer to said first wall then to said second wall;

making a first wall baseline pass along said first wall while measuring a third distance from said robot to said first wall with said second sound wave distance sensor and contemporaneously measuring a fourth distance from said robot to said first wall with said light wave distance sensor and determining a first wall baseline using said third distance and said fourth distance, said robot being substantially closer to said first wall then to said second wall; and navigating a serpentine path toward said second wall in response to distance measured from said robot to said walls with said light wave distance sensor in combination with said first wall baseline and said second wall baseline.

2. A method according to claim 1, further comprising:

making a finishing baseline pass along said second wall while measuring distance from said robot to said second wall with at least one of said sound wave distance sensors and determining a finishing baseline, said robot being substantially closer to said second wall then to said first wall; and navigating a finishing serpentine path toward said second wall in response to distance measured from said robot to said second wall with said first and second sound wave sensors in combination with said finishing base line.

3. A method according to claim 1, wherein said sound wave distance sensor uses ultrasonic sound waves.

4. A method according to claim 1, wherein said light wave distance sensor uses a laser light source.

* * * * *